3,001,985
METHOD FOR PRODUCING A HIGH VISCOSITY STARCH
Ernest A. Sowell, John E. Voigt, and Raymond J. Horst, St. Louis, Mo., assignors to Anheuser-Busch, Incorporated, St. Louis, Mo., a corporation of Missouri
No Drawing. Filed Dec. 17, 1958, Ser. No. 780,931
4 Claims. (Cl. 260—233.3)

The present invention relates generally to starch derivatives and more particularly to a novel high viscosity water soluble starch product and to a novel method of producing it from unmodified starch.

Specifically, the present invention pertains to a thick-thick boiling starch product which is produced by the reaction of a water soluble resin and unmodified starch.

The outstanding physical property used to characterize the behavior or appearance of a starch dispersion or solution is viscosity. Modified, raw and derivatized starches can all be categorized by their viscosity traits. The terms thin boiling, thick boiling and thick-thick boiling are general terms which have particular significance in the starch industry.

There are many instances where a startch having a higher viscosity than native, or thin boiling starch, is advantageous commercially, such as for corrugating, charcoal briquetting, and as a viscosity increasing agent in foods.

The present invention is an improvement over previous methods of preparing such a starch, in that the products of this invention are extremely easy to prepare, have a great range of viscosities, and are much less costly to produce.

It is the object of this invention to provide a novel thick-thick boiling starch, and a novel method for producing same using a relatively small amount of an inexpensive easily obtainable reactant which offers no difficulty in handling. More particularly, it is an object to provide a thick-thick boiling starch in granule form, and a novel method for producing same from unmodified starch utilizing a water soluble bi-functional resin monomer or its polymers which is capable of forming cross bonds between the hydroxyl groups of the starch molecule. Specifically, it is an object of this invention to provide a novel starch which when pasted provides a dispersion having a desired viscosity, and a novel method for producing same from unmodified starch using 1-3-bis (hydroxy-methyl)-2-imidazolidone, commonly known as dimethylol ethylene urea, which has two reactive groups which can combine with two hydroxyl units on the same or different starch molecules. These and other objects and advantages will become apparent hereinafter.

Briefly, the present invention comprises reacting a small amount of dimethylol ethylene urea with a raw starch slurry for a short period of time under controlled conditions of pH and temperature until a thick-thick boiling starch of the desired properties is obtained.

The invention further consists in the process hereinafter described and claimed, and in the cross-linked thick-thick boiling starch product made by said process.

A detailed description of the present invention follows:

A slurry of unmodified raw starch granules, including about 40% by weight of starch and about 60% by weight of water, is provided. The raw starch solids content is not critical, and may be varied as desired or needed, however, industrial practice dictates that a concentration of raw starch of about 40% solids be used.

A quantitative addition of the reactant, dimethylol ethylene urea is then made to the raw starch slurry to start the reaction. After the reaction is completed, the slurry is filtered, washed and the cake dried to a standard moisture content of about 10%. When the dry starch is then reslurried and caused to gelatinize, the paste viscosity will be increased substantially over that of an unmodified starch paste.

The reaction is carried out at a temperature of about 120° F. with sufficient agitation to suspend the raw starch granules. There may be adjustments of pH by the use of either acids or bases from about 2 to about 10. However, the reaction proceeds rapidly at the normal pH of 4 to 5 of a 40% unmodified starch slurry usually met with industrially, and adjustment of the pH from this figure is not necessary to promote the reaction.

Thus, we have provided a novel thick-thick boiling starch product in granule form which when cooked or pasted in water will give the desired thick-thick boiling characteristics.

It is possible by varying the amount of the reactant, dimethylol ethylene urea, from about 0.01% to about 2.5% by weight based on the weight of dry starch, to affect the final viscosity of the product. When the other variables are constant, the extent to which the viscosity of the starch is increased is proportional to the concentration of the reactant present based on the weight of dry starch.

Although the reaction will occur over a pH range of about 2 to about 10, it is preferred to have a pH of between about 4 and about 6 to obtain optimum results. The length of reaction time and the temperature at which the reaction is allowed to proceed also affect the viscosity of the final product.

The temperature of 120° F. was selected for illustrative purposes, since it is within the range most prevalent during the processing of unmodified starch. However, a temperature span of from about 70° F. to the temperature at which starch will gelatinize can be used without negating the reaction.

One hour is the optimum time for allowing the reaction to proceed, with longer reaction periods producing no more desirable results.

The amount of reactant, dimethylol ethylene urea, needed to increase the viscosity of the starch product to that of a thick-thick boiling starch is only about 0.01% based on the dry weight of the starch. It is preferred to use from about 0.01% to about 1.0% reactant by weight. When more than about 2.5% of the reactant is added to the starch, agglomeration of the granules ensues and the economic disadvantage becomes prohibitive even though further increases in viscosity may be obtained. The dimethylol ethylene urea tends to form polymers which are soluble, but when reacted with the starch, the polymers form an insoluble mass. More than about 2.5% dimethylol ethylene urea produces large clusters of granules which tend to clog screens and which are mostly insoluble. If more than about 2.5% dimethylol ethylene urea is used, the resulting product is not a suitable thick-thick boiling starch, and is entirely unsatisfactory for the uses desired of a product of this invention.

Any starch slurry such as corn starch, wheat starch, potato starch, rice starch, etc., can be reacted with dimethylol ethylene urea in the hereinbefore described reaction to give a satisfactory product.

No special equipment or handling precautions are necessary either during or following the reaction. The product is processed in the same manner as other common starch products, that is, it is diluted with water to about 28% solids, filtered, washed, dried and packaged.

The viscosities of cooked starch pastes may be readily determined by the Corn Industries Research Foundation's viscosimeter made expressely for this purpose. This instrument makes a continuous recording on a chart of the viscosity change during a cooking cycle of reproducible and controlled conditions. The unit of viscosity used as a basis by this instrument is the gram centimeter of torque. In all tests included herein, the viscosities were determined on a 5% starch solids basis.

As a practical method of comparison, taking into consideration the probable errors in testing, an increase of 20 units of viscosity over an unmodified control starch is taken as a minimum standard for a thick-thick boiling starch.

The following examples show typical thick-thick boiling starch products produced by this invention, together with viscosity changes of the starch products as compared to control starches.

Example I 1 lb. of an unmodified corn starch slurry of 23° Bé. is allowed to react with 0.25% dimethylol ehylene urea for one hour at 120° F. and a pH of 4.5. The starch product is then washed, filtered and dried. It has a viscosity increase of 150 gram centimeters over the control at 5% starch solids.

Example II 1 lb. of an unmodified corn starch slurry of 23° Bé. is allowed to react with 0.025% dimethylol ethylene urea for one hour at 120° F. and a pH of 4.5. The starch product is then washed, filtered and dried. It has a viscosity increase of 52 gram centimeters over the control starch at 5% solids.

Example III 1 lb. of an unmodified corn starch slurry of 23°Bé. is allowed to react with 0.25% dimethylol ethylene urea for one hour at 120° F. and a pH of 9.0. The starch product is then washed, filtered and dried. It has a viscosity increase of 96 gram centimeters over the control starch at 5% solids.

Example IV 1 lb. of an unmodified corn starch slurry of 23° Bé. is allowed to react with 0.25% dimethylol ethylene urea for one hour at 120° F. and a pH of 2.0. The starch product is then washed, filtered and dried. It has a viscosity increase of 105 gram centimeters over the control starch at 5% solids.

Example V 1 lb. of an unmodified corn starch slurry of 23° Bé. is allowed to react with 2.5% dimethylol ethylene urea for one hour at 120° F. and a pH of 4.5. The starch product is then washed, filtered and dried. It has a viscosity increase of 225 gram centimeters over the control starch at 5% solids.

Example VI 1 lb. of an unmodified corn starch slurry of 23° Bé. is allowed to react with 0.01% dimethylol ethylene urea for one hour at 120° F. and a pH of 4.0. The starch product is then washed, filtered and dried. It has a viscosity increase of 40 gram centimeters over the control starch at 5% solids.

Thus it is apparent that a novel thick-thick boiling starch and method of producing same which fulfills all the objects and advantages sought therefor has been provided by reacting from about 0.01% to about 2.5% by weight dimethylol ethylene urea with a starch slurry under controlled conditions of pH, time and temperature.

This invention is intended to cover all changes and modifications of the examples of the invention herein chosen for purposes of the disclosure, which do not constitute departures from the spirit and scope of the invention.

What is claimed is:

1. A process for making a granular, water dispersible starch including the step of reacting starch with at least about 0.01% by weight dimethylol ethylene urea at a pH of from about 2 to about 10 and a temperature below the gelatinization temperature of the starch and above about 70° F.

2. A process for making a granular starch which, when cooked provides a dispersion of desired viscosity, comprising the step of reacting a starch slurry with from about 0.01% to about 2.5% dimethylol ethylene urea by weight based on the weight of dry starch at a pH of from about 2 to about 10 and a temperature below the gelatinization temperature of the starch and above about 70° F.

3. A process for making a granular starch, which when cooked provides a dispersion of desired viscosity, comprising the step of reacting a starch slurry with from about 0.01% to about 1.0% dimethylol ethylene urea by weight based on the weight of dry starch at a pH of from about 2 to about 10 and a temperature below the gelatinization temperature of the starch and above about 70° F.

4. A process for making a starch product which when cooked provides a dispersion of desired viscosity, comprising the steps of providing a starch slurry at a pH of between about 2 to about 10 and a temperature of between about 70° F. and about 130° F., reacting therewith for up to about one hour from about 0.01% to about 2.5% dimethylol ethylene urea by weight based on the weight of dry starch, and drying the resulting product to recover a granular dimethylol ethylen urea modified crosslinked starch.

References Cited in the file of this patent

UNITED STATES PATENTS

| | | |
|---|---|---|
| 2,400,820 | Glarum et al. | May 21, 1946 |
| 2,407,071 | Gill et al. | Sept. 3, 1946 |
| 2,548,455 | Walker et al. | Apr. 10, 1951 |
| 2,805,220 | Gerwitz | Sept. 3, 1957 |
| 2,838,465 | Porowski | June 10, 1958 |
| 2,879,236 | Yundt | Mar. 24, 1959 |

OTHER REFERENCES

Ott et al.: High Polymers, vol. V (Cellulose), second edition, 1954, page 936.